United States Patent
Kobayashi et al.

(10) Patent No.: US 6,323,906 B1
(45) Date of Patent: Nov. 27, 2001

(54) IMAGE PROCESSING APPARATUS

(75) Inventors: Takashi Kobayashi, Mitaka; Shinichi Hatae, Kawasaki, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/666,614

(22) Filed: Sep. 20, 2000

Related U.S. Application Data

(63) Continuation of application No. 08/832,792, filed on Apr. 4, 1997, now Pat. No. 6,144,411.

(30) Foreign Application Priority Data

Apr. 9, 1996 (JP) .................................................. 8-086797
May 1, 1996 (JP) .................................................. 8-110850

(51) Int. Cl.$^7$ .................................................. H04N 7/01
(52) U.S. Cl. .................... 348/441; 348/231; 348/552; 386/117; 358/906
(58) Field of Search .................................. 348/231, 441, 348/705, 552; 386/117, 119, 120; 358/906

(56) References Cited

U.S. PATENT DOCUMENTS

| | | | |
|---|---|---|---|
| 4,691,253 | 9/1987 | Silver | 360/33.1 |
| 4,797,746 | 1/1989 | Ashcraft | 358/140 |
| 5,585,856 | 12/1996 | Nakaya et al. | 348/441 |
| 5,712,681 | 1/1998 | Suh | 348/231 |
| 5,787,259 * | 7/1998 | Haroun et al. | 348/14 |

* cited by examiner

*Primary Examiner*—Victor R. Kostak
(74) *Attorney, Agent, or Firm*—Morgan&Finnegan, LLP

(57) ABSTRACT

An image processing apparatus includes an input unit for inputting an image signal, a signal processing unit for processing an output from the input unit to generate an image signal of a first format, a conversion unit for compressing an output from the signal processing unit and converting the same to an image signal of a second format and a digital interface unit for selectively transmitting the output from the signal processing unit and the output from the conversion unit to an external equipment.

10 Claims, 14 Drawing Sheets

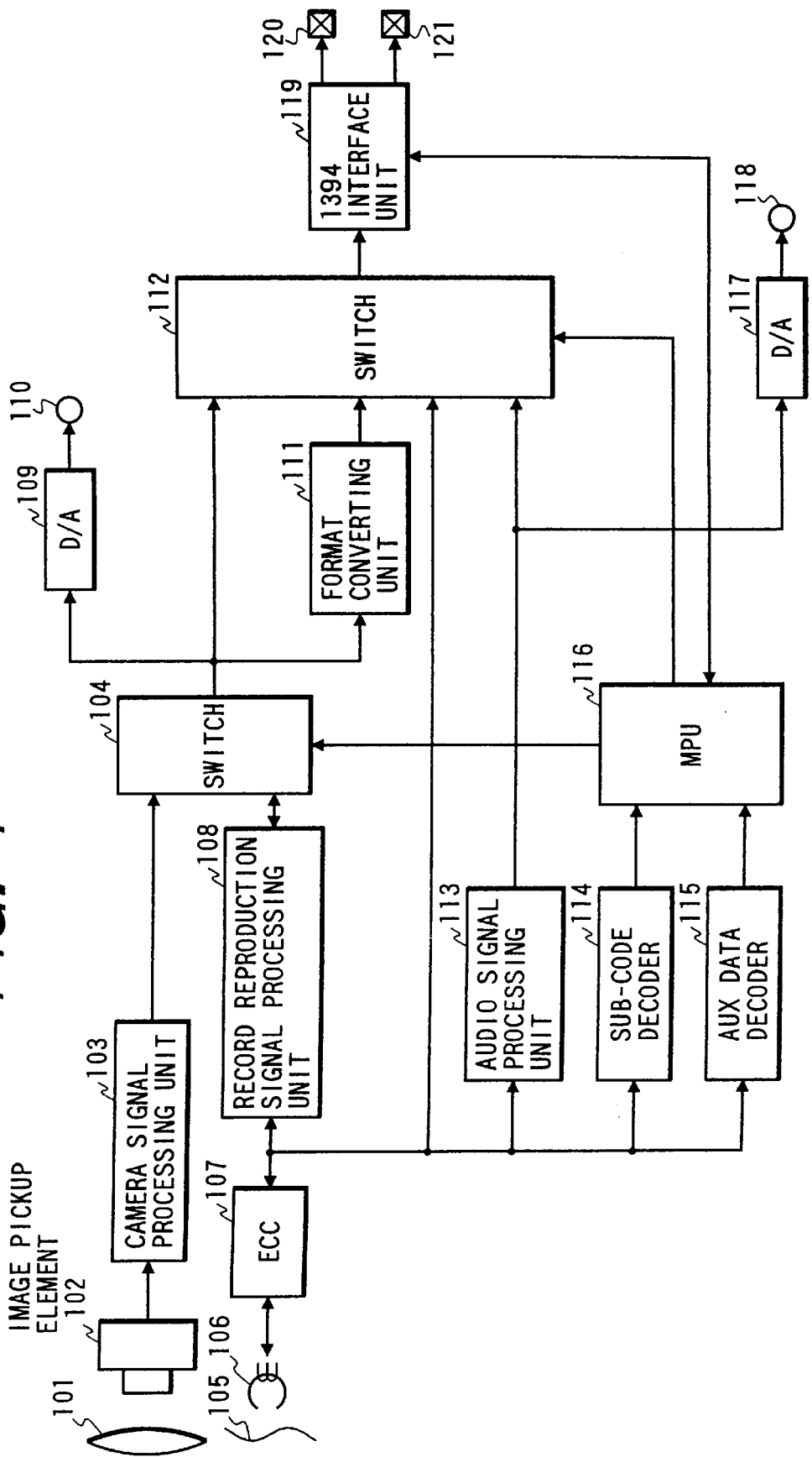

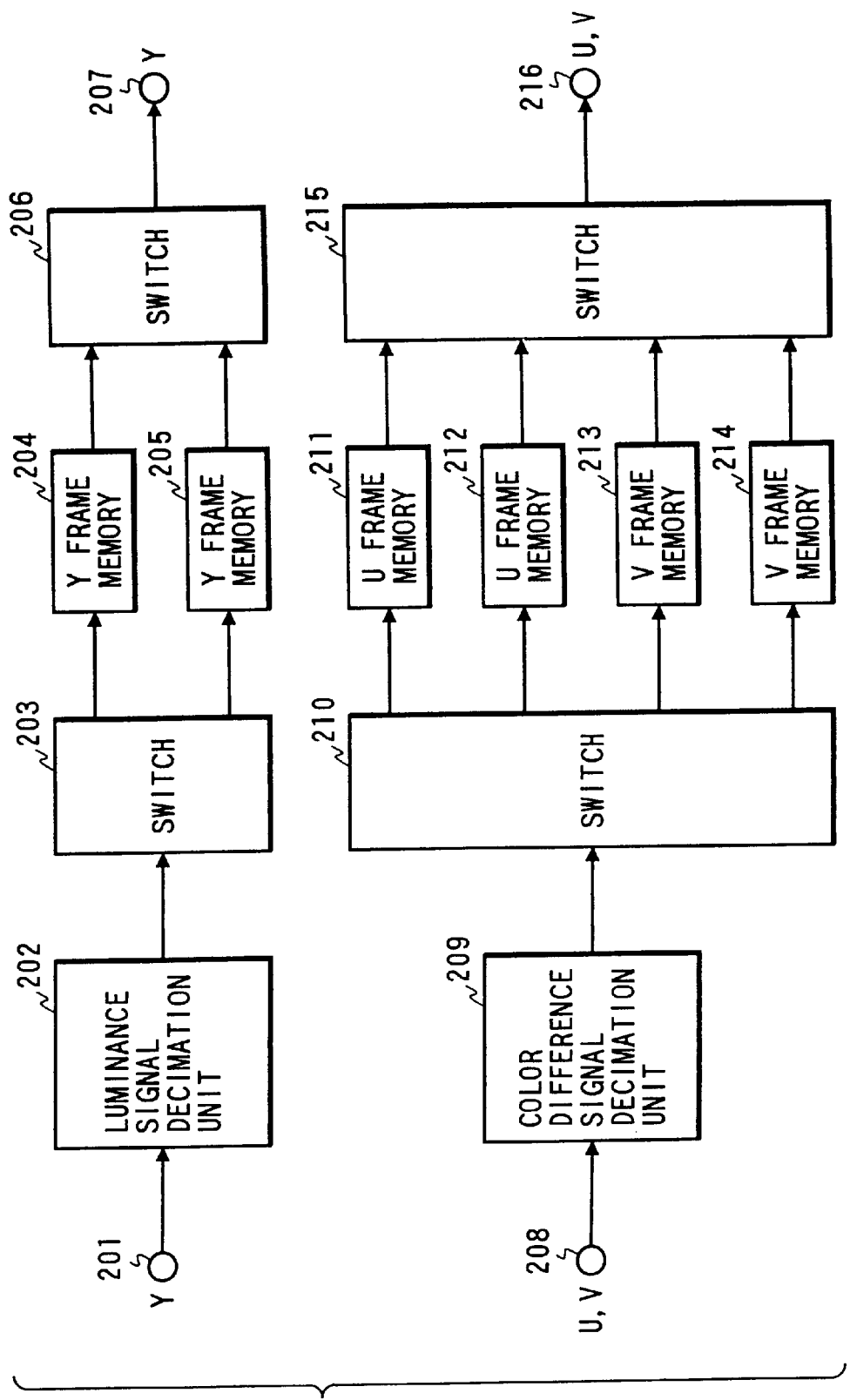

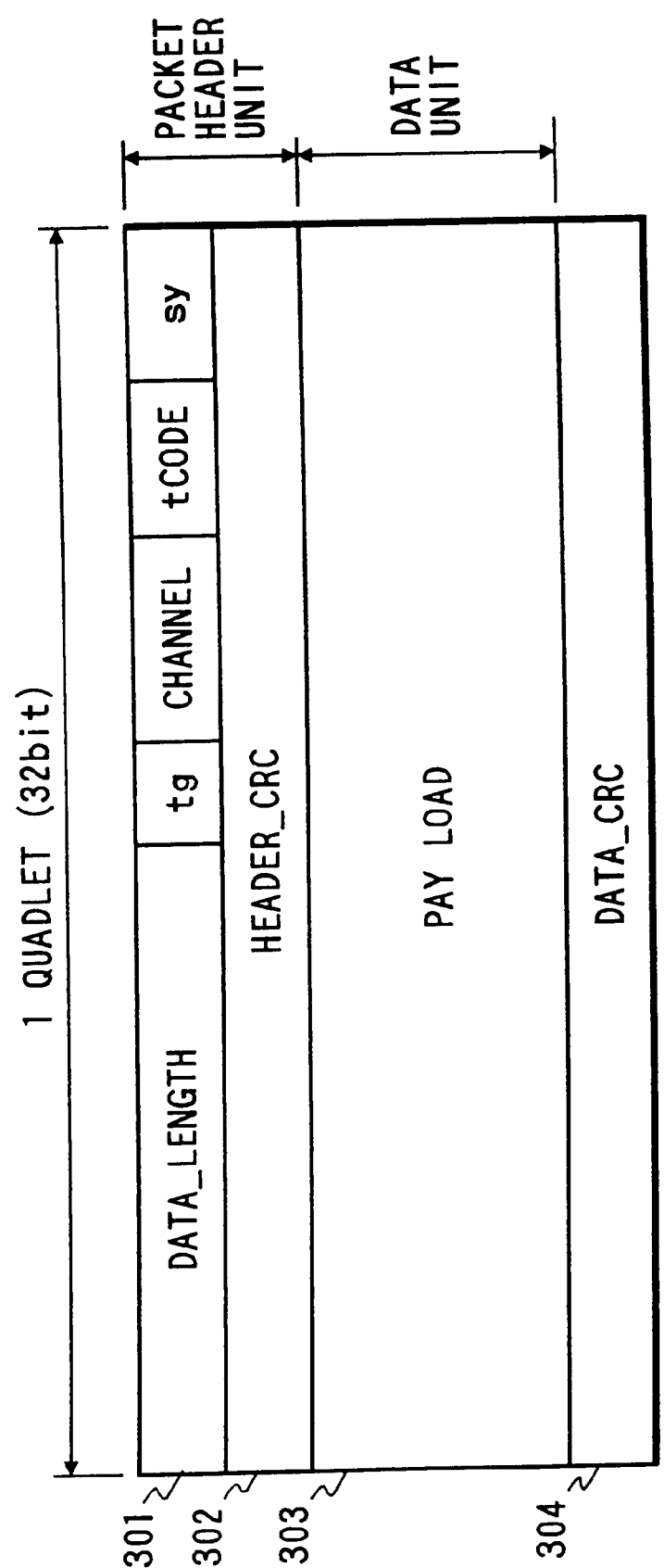

FIG. 4

<YUV(4:1:1) FORMAT>

| U−(K+0) | Y−(K+0) | Y−(K+1) | V−(K+0) |
|---|---|---|---|
| Y−(K+2) | Y−(K+3) | U−(K+4) | Y−(K+4) |
| Y−(K+5) | V−(K+4) | Y−(K+6) | Y−(K+7) |
|  |  |  |  |
| U−(K+Pn-8) | Y−(K+Pn-8) | Y−(K+Pn-7) | V−(K+Pn-8) |
| Y−(K+Pn-6) | Y−(K+Pn-5) | U−(K+Pn-4) | Y−(K+Pn-4) |
| Y−(K+Pn-3) | V−(K+Pn-4) | Y−(K+Pn-2) | Y−(K+Pn-1) |

Pn : PIXEL NUMBER/PACKET
K : Pn × n (n = 0, ···, N−1)
(Pn × N = TOTAL PIXEL NUMBER/FRAME)

FIG. 5

<YUV(4:2:2) FORMAT>

| U−(K+0) | Y−(K+0) | V−(K+0) | Y−(K+1) |
|---|---|---|---|
| U−(K+2) | Y−(K+2) | V−(K+2) | Y−(K+3) |
| U−(K+4) | Y−(K+4) | V−(K+4) | Y−(K+5) |
|  |  |  |  |
| U−(K+Pn-6) | Y−(K+Pn-6) | V−(K+Pn-6) | Y−(K+Pn-5) |
| U−(K+Pn-4) | Y−(K+Pn-4) | V−(K+Pn-4) | Y−(K+Pn-3) |
| U−(K+Pn-2) | Y−(K+Pn-2) | V−(K+Pn-2) | Y−(K+Pn-1) |

Pn : PIXEL NUMBER/PACKET
K : Pn × n (n = 0, ···, N−1)
(Pn × N = TOTAL PIXEL NUMBER/FRAME)

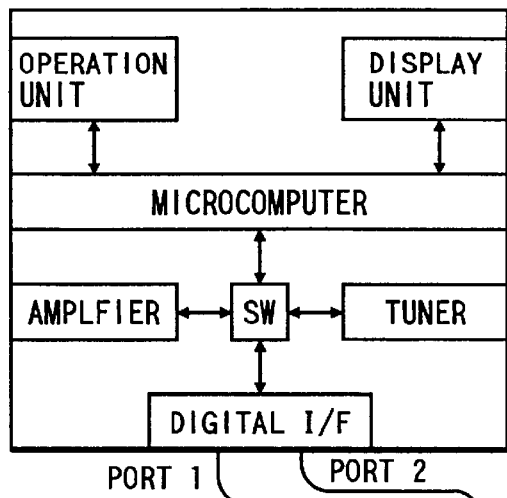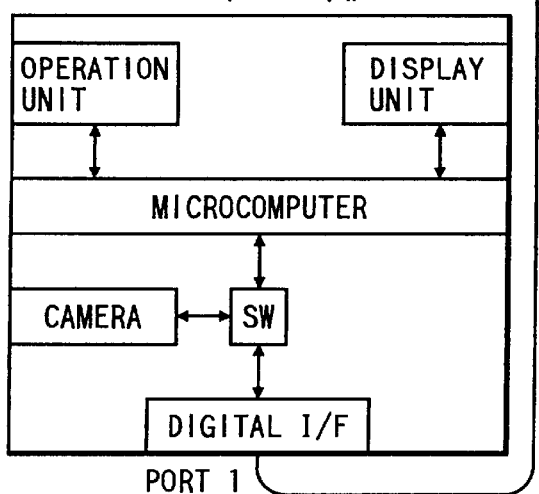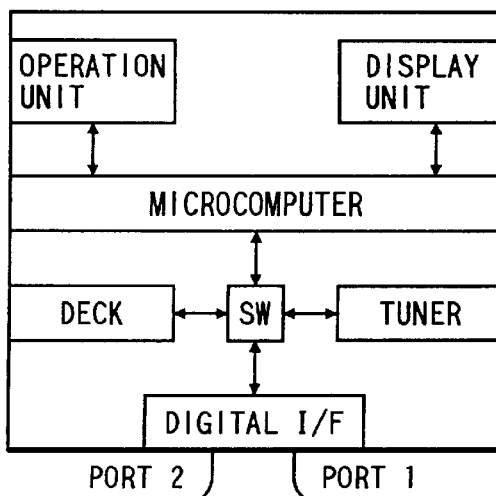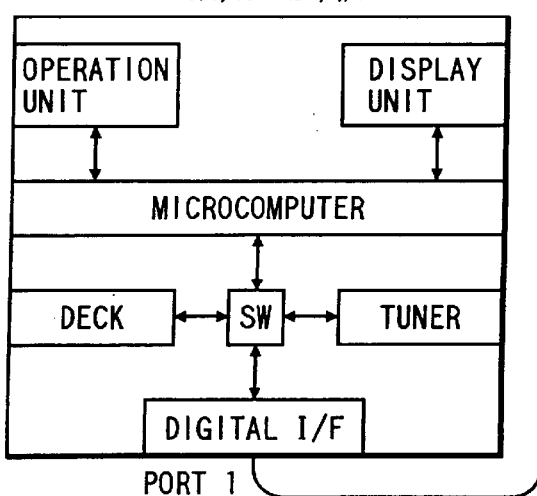
FIG. 13

IMAGE PROCESSING APPARATUS

This application is a continuation of Ser. No. 08/832,792 filed Apr. 4, 1997, U.S. Pat. No. 6,144,411.

BACKGROUND OF THE INVENTION

1. Field of the Invention

The present invention relates to an image processing apparatus which is most suitable for use in applying a predetermined image processing to an image signal to transfer it to other equipment through a digital interface.

2. Related Background Art

As the multimedia technology has recently been advanced, there is strong demand to transfer a motion picture image or a still image picked up by an image pick-up device such as a video camera or a camera-in-VTR to a personal computer (hereinafter referred to as a PC) for display, and technologies to meet the demand have been developed.

FIG. 15 shows a configuration of a prior art communication system having a camera-in-VTR 1502 connected thereto. Numeral 1501 denotes a portable camera-in-VTR, numeral 1502 denotes a stationary VTR, numeral 1503 denotes a TV, numeral 1504 denotes a digital camera for a PC and numeral 1503 denotes a personal computer (PC). The respective equipments are connected through an analog interface.

Usually, in order to display a motion picture image or a still image, it is necessary to format it in a VGA format, but in a prior art image pick-up device such as a camera-in-VTR 1501, an image signal in an NTSC system or a PAL system is generated. Accordingly, in order to display the motion picture image on the PC, it is necessary to generate a pick-up image of a VGA format by the digital camera 1504 for the PC which is separate from the camera-in-VTR 1501 and transfer it. Namely, when the picked-up image is to be watched by the TV or the PC, a plurality of image pick-up devices which conform to the respective equipments need be provided.

As a method for solving the above problem, it has been proposed to provide, in the PC, means for converting the image signal of the NTSC system or the PAL system supplied from the image pick-up device such as the camera-in-VTR to the VGA format. In this case, since the image pick-up device and the PC are connected through an analog interface, an image quality is deteriorated.

SUMMARY OF THE INVENTION

It is an object of the present invention to solve the above problems.

It is another object of the present invention to allow an image processing apparatus to output image signals of various formats.

It is other object of the present invention to allow an image processing apparatus to output image signals of various formats in a time division fashion through a digital interface.

In accordance with one aspect to achieve the above objects, an image processing apparatus of the present invention comprises image pick-up means, signal processing means for processing an output from the image pick-up means to generate an image signal of a first format, conversion means for converting an output from the signal processing means to an image signals of a second format, and digital interface means for transmitting at least one of the output from the signal processing unit and an output from the conversion means to an external equipment.

In accordance with another aspect, an image processing apparatus of the present invention comprises image pick-up means for picking up an image of an object, reproducing means for reproducing an image signal of a second format recorded on a recording medium, signal processing means for generating an image signal of a first format from an output of the image pick-up means or an output from the reproducing means, conversion means for converting an output from the signal processing means to an image signal of a third format, and digital interface means for transmitting the output from the signal processing means and at least one of outputs from the conversion means.

In accordance with other aspect, an image rocessing apparatus of the present invention compresses image pick-up means for picking up an image of an object, recording and reproducing means for converting an image signal to an image signal of a second format, recording the same on a recording medium and reproducing the same therefrom, first signal processing means for applying a predetermined process to an output from the image pick-up means to generate an image signal of a first format, and digital interface means for transmitting at least one of an output of the recording and reproducing means and an output of the first signal processing means.

In accordance with a further aspect, an image processing apparatus of the present invention comprises input means for inputting an image signal, signal processing means for processing an output from the input means to generate an image signal of a first format, conversion means for compressing an output from the signal processing means and converting the same to an image signal of a second format, and digital interface means for selectively transmitting the output from the signal processing means and the output from the conversion means to an external equipment.

Other objects and features of the present invention will be apparent from the following description of the present invention.

BRIEF DESCRIPTION OF THE DRAWINGS

FIG. 1 shows a block diagram of a camera-in-VTR in accordance with a first embodiment of the present invention;

FIG. 2 shows a block diagram of a detailed configuration of a format conversion unit 111 of the camera-in-VTR;

FIG. 3 shows a format of a packet in an isochronous transfer mode complied to the IEEE P1394;

FIG. 4 shows a format of image data of a VGA format stored in a payload field of the isochronous packet;

FIG. 5 shows another format of image data of the VGA format stored in the payload field of the isochronous packet;

FIG. 13 shows a communication system constructed by using an IEEE P1394 serial bus;

DETAILED DESCRIPTION OF THE PREFERRED EMBODIMENTS

The preferred embodiments of the present invention will be described in detail hereinafter with reference to the accompanying drawings.

First Embodiment

FIG. 1 shows a camera-in-VTR in accordance with a first embodiment of the present invention. The camera-in-VTR comprises an analog interface and a digital interface for communication with an external equipment. The analog interface of the present invention can communicate a standard television signal of an NTSC system or a PAL system with the external equipment.

The digital interface of the present invention (for example, a digital interface complied to an IEEE P1394 serial bus) can transfer a digital image signal of a VGA format to an external equipment.

An outline of a communication system constructed by using the IEEE P1394 digital interface is explained below.

As shown in FIG. 13, this system comprises TV1, VTR1 and VTR2 as digital equipments and a digital cam coder (hereinafter referred to as DVCR1). The DVCR1 and the TV1, TV1 and the VTR1, and the VTR1 and the VTR2 are connected by the P1394 serial bus. Each of the above equipments has a function to relay digital data and control data on the P1394 bus.

A cable for connecting the P1394 interface of each of the equipments has three sets of shielded paired lines and two sets of them are used to transfer information data and a protocol signal, and the other one set is used to supply power to each digital interface so that even if an equipment having power turned off is present on the communication system, a portion of the communication system is not disconnected.

Figure 14:
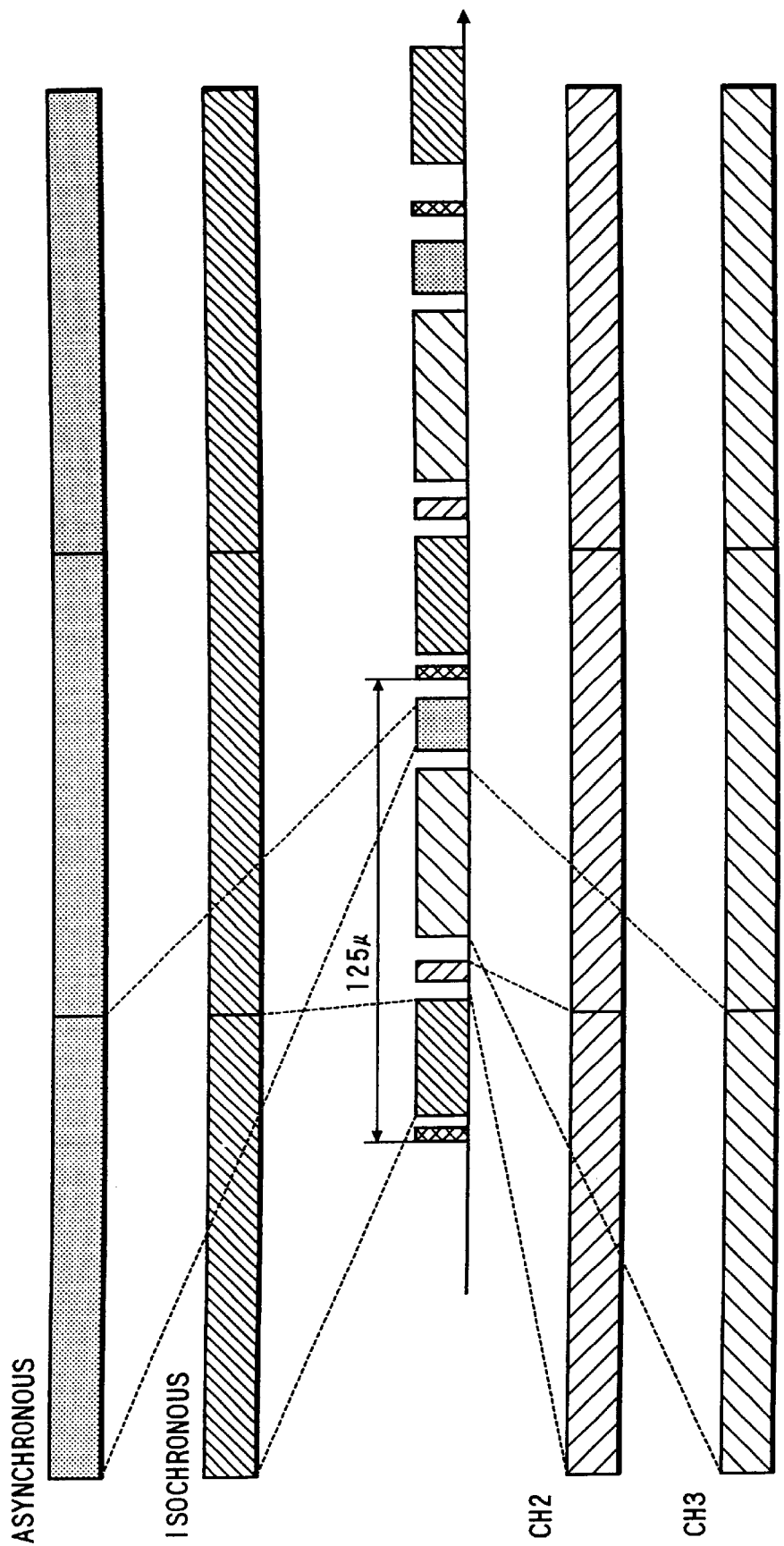
FIG. 14 shows an example of a communication cycle in the IEEE P1394 serial bus.
Figure 15:
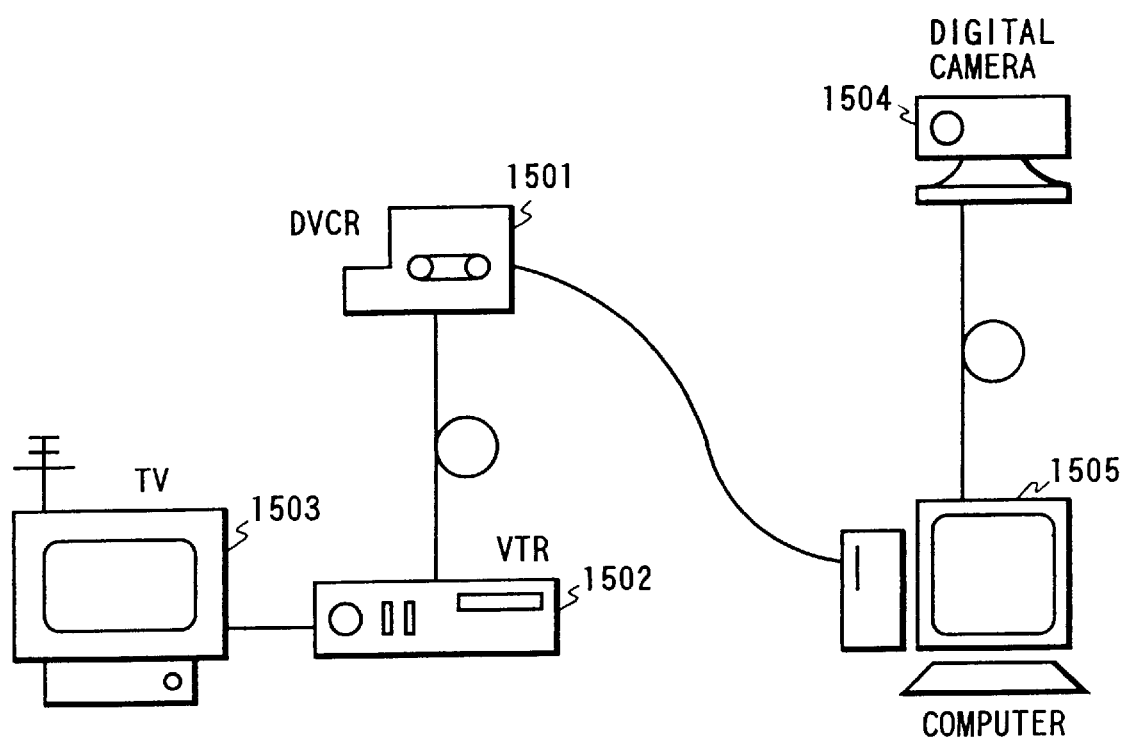
FIG. 15 shows a prior art communication system.

As shown in FIG. 14, in the P1394, the communication is conducted in a predetermined communication cycle (125 $\mu$s). Two types of transfer modes may be concurrently present in each communication cycle. One is an isochronous transfer mode which assures a transfer band at a constant data rate and it is used for the communication of data having a time axis such as video data or audio data. The other is an asynchronous transfer mode for inperiodically transferring control data such as a control command as required. A cycle start packet (hereinafter referred to as a CSP) is included at the beginning of each communication cycle, followed by the setting of a period of the isochronous transfer mode, and an isochronous packet is communicated. In the isochronous mode, a channel number is assigned to each transfer band so that a plurality of isochronous packets may be transferred in each communication cycle. After the isochronous transfer and before the next communication cycle, the asynchronous transfer may be executed.

By assigning a channel 1 to the DVCR1, the DVCR1 sends an isochronous communication packet of the channel number 1 onto the bus immediately following to the cycle start packet, and the VTR1 monitors the packet on the bus to read in the packet having the channel number 1 assigned thereto so that the isochronous communication is conducted between the DVCR1 and the VTR1. Similarly, by assigning the channel number 2 to the packet from the VTR2 to the TV1, the isochronous communication is conducted between the VTR2 and the TV1 so that the isochronous communications with the channel 1 and the channel 2 are conducted concurrently. After the transmission of all of the isochronous communication packets in each communication cycle is completed, the period before the next cycle packet is used for the asynchronous communication.

In the communication system described above, when a digital equipment is newly connected at the power-on or disconnected, node IDs (physical addressed, #0, #1 and #3 in FIG. 13) are automatically allocated to the respective equipments (nodes) in accordance with a connection configuration by the following procedure in accordance with an address program and an address table stored in a memory of a microcomputer to automatically set topology. The node ID allocation procedure is briefly explained below. The procedure comprises determination of a hierarchical structure of the system and allocation of physical addresses to the respective nodes.

Assuming the TV1 as a node A, the DVCR1 as a node B, the VTR1 as a node C and the VTR2 as a node D, each node notifies to nodes to which itself is connected that itself is a parent node, and a node which first notifies is prioritized so that a mother-daughter relation of the nodes in the system, that is, the hierarchical structure of the system and root nodes which are not daughter nodes of other node are finally determined. Specifically, the node D notifies to the node C that the former is a parent and the node B notifies to the node A that the former is a parent. Further, when the node A notifies to the node C that the former is a parent and the node C notifies to the node A that the former is a parent, the node which first notifies is prioritized, that is, if the notice by the node C is first, the node A is the parent of the node C. As a result, the node A is not daughter of any other nodes and it is a root node. After the mother-daughter relation is determined in this manner, the physical addresses are assigned. The assignment of the physical addresses is conducted basically by granting the assignment of the addresses to the daughter nodes by the mother node and granting the assignment of the addresses to the daughter node in the ascending order of port numbers to which the daughter nodes are connected.

In FIG. 13, the node A grants the address assignment to the node B and the node B sends to the bus the address of itself with the addition of the physical address #0 so that it notifies to other nodes that "the node #0 has been allocated". Then, when the node A grants the address assignment to the node C, it also grants the address assignment to the node D which is the daughter node of the node C so that the node D sends to the bus the address of itself with the addition of the physical address #1 which is next to the physical address #0. Then, the node C sends to the bus the address of itself with the addition of the physical address #2, and finally the node A sends to the bus the address of itself with the addition of the physical address #3. Details of the P1394 serial bus including the allocation procedure of the node ID is disclosed in "IEEE P1394 Serial Bus Specification".

The data transfer procedure is now explained. The data transfer is permitted by the assignment of the address described above. In the P1394, arbitration of the bus requests is conducted by the root node prior to the data transfer. Namely, in the P1394, as shown in FIG. 14, the arbitration is first required in order to conduct the transfer of only one channel at a certain timing, each node issues a bus request to its parent node when it wants the transfer, and the root node consequently arbitrates the requests of the respective nodes. The node which finally acquired the bus right designates a transfer rate before it starts the data transfer by notifying a transmission destination node of the transfer rate, e.g., 100 Mbps, 200 Mbps or 400 Mbps.

Then, for the isochronous transfer, after a transmission source node receives a cycle start packet sent by a cycle master which is the root node in synchronism with the communication cycle, it immediately starts the data transfer over the designated channel. The cycle master sends the cycle start packet to the bus and times the respective nodes. On the other hand, for the ashnchronous transfer for conducting the control data of the command, the arbitration for the ashnchronous communication is conducted after the completion of the isochronous transfer of the respective communication cycles, and the data transfer from the transmission source node to the transmission destination node is conducted.

The outline of the communication system by using the P1394 has thus been described.

Configuration and operation of the camera-in-VTR of the first embodiment are now explained.

In FIG. 1, numeral 101 denotes a lens for focusing an optical image of an object form an image on an image pick-up element 102. The image pick-up element 102 comprises a CCD image sensor and converts the optical image from the lens 101 to an electrical signal and supplies it to a camera signal processing unit 103. The camera signal processing unit 103 processes the signal from the image pick-up element 102 into a predetermined signal form. The camera signal processing unit 103 in the present embodiment processes the image signal inputted from the image pick-up element 102 into a digital signal of the NTSC system (525-60 system). Namely, in the camera signal processing unit 103 of the present embodiment, when an intensity signal Y and color difference signals U and V are generated from the input signal from the image pick-up element 102, the sampling is made such that a ratio of sampling frequencies of respective component signals are Y:U:V=4:2:2.

When an image signal outputted from the camera signal processing unit 103 is recorded on a recording medium such as a magnetic tape 105, the image signal is supplied to a recording/reproducing signal processing unit 108. The recording/reproducing signal processing unit 108 applies a known high efficiency coding (for example, a compression process of an SD format) to the digital image signal from the camera signal processing unit 103. The compressed digital image signal has an error correcting parity code added thereto by an error correction unit (ECC) 107 and then it is recorded on the magnetic tape 105 through a helical scan head 106.

Figure 7:
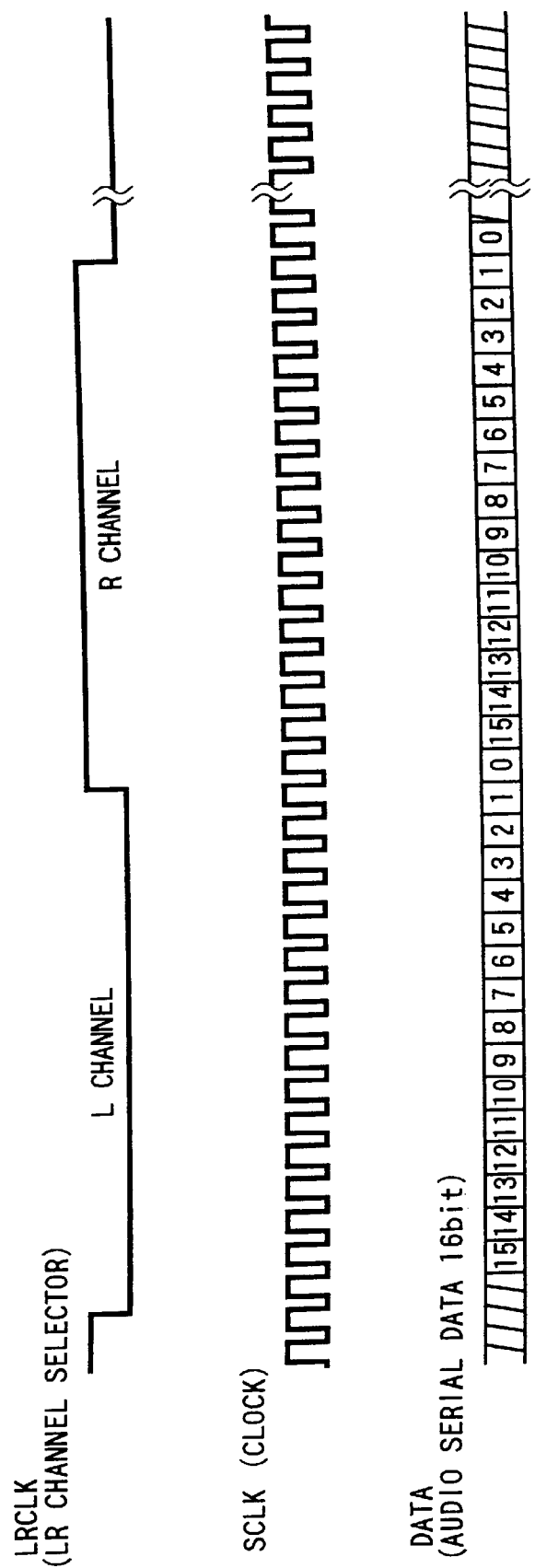
FIG. 7 shows a timing chart of a process of an audio signal processing unit 113.

An audio signal processing unit 113 processes a stereo audio signal reproduced from the magnetic tape 105 and alternately outputs L-channel and R-channel audio serial data as shown in FIG. 7. The L-channel and R-channel audio data are inputted to a switch 112 and converted to an analog audio signal by a D/A converter 117 and it is outputted from an output terminal 118.

A sub-code decoder 114 and an AUX data decoder 115 decode a sub-code and an AUX code, respectively, in a sub-code area of a track on the magnetic tape 105 and they are inputted to a micro-processing unit (MPU) 116.

The MPU 116 controls the switch 104 in accordance with a control signal inputted from an external equipment through a console unit, not shown or a 1394 interface unit 119 and selectively outputs a digital image signal of the NTSC system (Y:U:V=4:2:2) supplied from the camera signal processing unit 103 or the recording/reproducing signal processing unit 108 to succeeding stage processing units (D/A converter 109, switch 112 and format conversion unit 11). The digital image signal supplied from the switch 104 to the D/A converter 109 is converted to an analog signal by the D/A converter 109 and outputted to the external equipment through the output terminal 110.

The digital image signal supplied from the switch 104 to the format conversion unit 111 is converted to an image signal of a predetermined format. The format conversion unit 111 of the present embodiment applies a decimation process to the digital image signal of the NTSC system (Y:U:V=4:2:2) supplied from the camera signal processing unit 103 or the recording/reproducing signal processing unit 108 to generate a non-compressed image signal of the VGA format (Y:U:V=4:1:1). Specifically, pixels are discarded and the color difference signals U and V are sampled such that the intensity signal Y of the NTSC system has 640 pixels horizontally and 480 lines vertically, and each of the color difference signals U and V have 160 pixels horizontally and 120 lines vertically.

For example, when an effective area (an area actually displayed on an image screen) of the intensity signal Y of the NTSC system has 720 pixels horizontally and 480 lines vertically, the pixels are discarded at a ratio of 9:8 so that the number of horizontal pixels is 640. When an effective area of each of the color difference signals U and V has 180 horizontal pixels and 480 vertical lines, the horizontal pixels are discarded at a ratio of 9:8 and the vertical pixels are discarded at a ratio of 4:1. The color difference signals U and V are partially discarded, respectively, and sampled to one half in a line sequence system horizontally to the image screen. Thus, the sampling ratio of the intensity signal Y and the color difference signals U and V is 4:1:1. Namely, the decimation process in the present embodiment is to partially discard the pixels of the intensity signal and the color difference signals and sub-sample the color difference signals. In the decimation process of the present embodiment, the pixels are partially discarded at the ratio of 9:8 when the effective area of the image signal is converted although the present invention is not limited thereto but a known linear interpolation process may be used instead.

FIG. 2 shows a detailed configuration of the format conversion unit 111. An operation thereof is now explained.

The intensity signal Y is inputted to an intensity signal decimation unit 202 through an input terminal 201, and the color difference signals U and V are alternately inputted to a color difference signal decimation unit 209 through an input terminal 208. The intensity signal decimation unit 202 conducts the decimation process such that the effective area of the intensity signal has 640 pixels horizontally and 480 lines vertically. The color difference signal decimation unit 209 conducts the partial discarding such that the effective area of each of the color difference signals U and V has 160 pixels horizontally and 120 lines vertically, and also sub-samples the color difference signals U and V to one half such that the sampling frequency of each of the color difference signals U and V is halved.

An output from the intensity signal decimation unit 202 is alternately stored at a frame period of succeeding stage Y frame memories 204 and 205 through a switch 203. A switch 206 reads the intensity signals by frame unit stored in the Y frame memories 204 and 205 in line sequence. Namely, the interlaced intensity signal Y at 60 fields/second is converted to a non-interlaced intensity signal Y at 30 frames/second. By this process, the switch 206 may generate the non-interlaced intensity signal Y (640×480) at 30 frames/second and supply it to an output terminal 207. In the present embodiment, two Y frame memories are used in order to prevent the writing of the next frame intensity signal to the memory during the reading.

On the other hand, the output of the color difference signal decimation unit 209 is alternately stored at the frame period in succeeding stage U frame memories 211 and 212 and V frame memories 213 and 214 through a switch 210. A switch 215 reads the color difference signals U and V by the frame unit stored in the respective frame memories (211 to 214) in line sequence. Namely, the respective interlaced color difference signals U and V at 60 fields/second are converted to non-interlaced color difference signals U and V at 30 frames/second. By this process, the switch 215 may generate the non-interlaced color difference signals U and V (160×120 each) at 30 frames/second and supply it to the output terminal 216.

In this manner, the format conversion unit 111 may convert the image signal of the NTSC system to the image signal of the VGA format which is 640×480 (Y:U:V=4:1:1, 30 frames/second).

Further, depending on a conformable transfer rate (100, 200 or 400 Mbps) of a physical layer of the P1394 interface or depending on a request of a transfer destination, the VGA format may be converted to one of several modes. For example, in the present embodiment, the image signal of the NTSC system is converted to the VGA format which is 640×480 (Y:U:V=4:1:1, 30 frames/second), but when the conformable transfer rate of the physical layer of the P1394 interface is 400 Mbps, it may be converted to the digital image of 640×480 (Y:U:V=4:2:2, 30 frames/second). Alternatively, depending on a request from an equipment of the transmission destination, the image signal of the NTSC system may be converted to the VGA format which is 640×480 (Y:U:V=4:1:1, 15 frames/second).

As described above, the format conversion unit 111 of the present embodiment controls conversion of the digital image signal of the NTSC format to the digital image signal of the VGA format of 640×480 when the conformable transfer rate of the 1394 interface unit 119 is 200 Mbps. However, when the conformable transfer rate of the 1394 interface unit 119 is low and the transfer band allocated when the digital signal of the VGA format is transferred is narrow, it may control to generate a digital image signal of a smaller number of pixels. For example, when the conformable transfer rate of the physical layer of the 1394 interface unit 119 is 100 Mbps, the format conversion unit 111 may convert the effective area of the digital image signal (640×480) to a digital image signal of one-quarter size (320×240). Namely, it further discards the pixels such that the intensity signal Y has 320 pixels horizontally and 240 lines vertically, and the each of color difference signals U and V has 160 pixels horizontally and 120 lines vertically. It also may convert the image signal of the NTSC system to the VGA format of 320×240 (Y:U:V=4:2:2, 30 frames/second).

The image signals of various formats inputted to the 1394 interface unit 119 through the switch 112 are packetized to a packet format shown in FIG. 3. The packet structure shown in FIG. 3 is for a packet of the isochronous transfer mode, and numeral 301 denotes a header field for indicating a data length of a payload unit 303 and a channel number of a transfer band being used, numeral 302 denotes a CRC for correcting an error in the header field, numeral 303 denotes a payload field for storing image data to be transmitted, and numeral 304 denotes a CRC for correcting an error in a data field.

The digital image signal of the VGA format inputted to the 1394 interface unit 119 is divided into a plurality of data blocks by a predetermined procedure and packetized to packet data of an isochronous packet format. FIG. 4 shows a format of image data of the VGA format stored in the payload field of the isochronous packet. For example, when the VGA format data of 640×480 (Y:U:V=4:1:1) is inputted to the 1394 interface unit 119 of the present embodiment, it is packetized such that 2H of image data is stored in the payload field of each packet. Namely, it is packetized such that the number of pixels per packet is 1280 and the number of quadlets per packet is 480. The conformable transfer rate of the physical layer of the 1394 interface unit 119 is now 200 Mbps. When the VGA format of 640×480 (Y:U:V=4:1:1, 15 frames/second) is inputted to the 1394 interface unit 119, it is packetized such that 1H of image data is stored in the payload field of each packet.

The format of the image signal of the VGA format inputted to the 1394 interface unit 119 is changed in accordance with the conformable transfer rate of the physical layer and the request from the external equipment. For example, when the format conversion unit 111 generates the image signal of the VGA format which is 320×240 (Y:U:V=4:2:2, 30 frames/second) in response to the compatible transfer rate of the physical layer of the request from the external equipment, the 1394 interface unit 119 generates image data of a structure shown in FIG. 5 and packetizes such that 1H of image data is stored in the payload field of each packet. Namely, it packetizes such that the number of pixels per packet is 320 and the number of quadlets per packet is 160.

Figure 6:
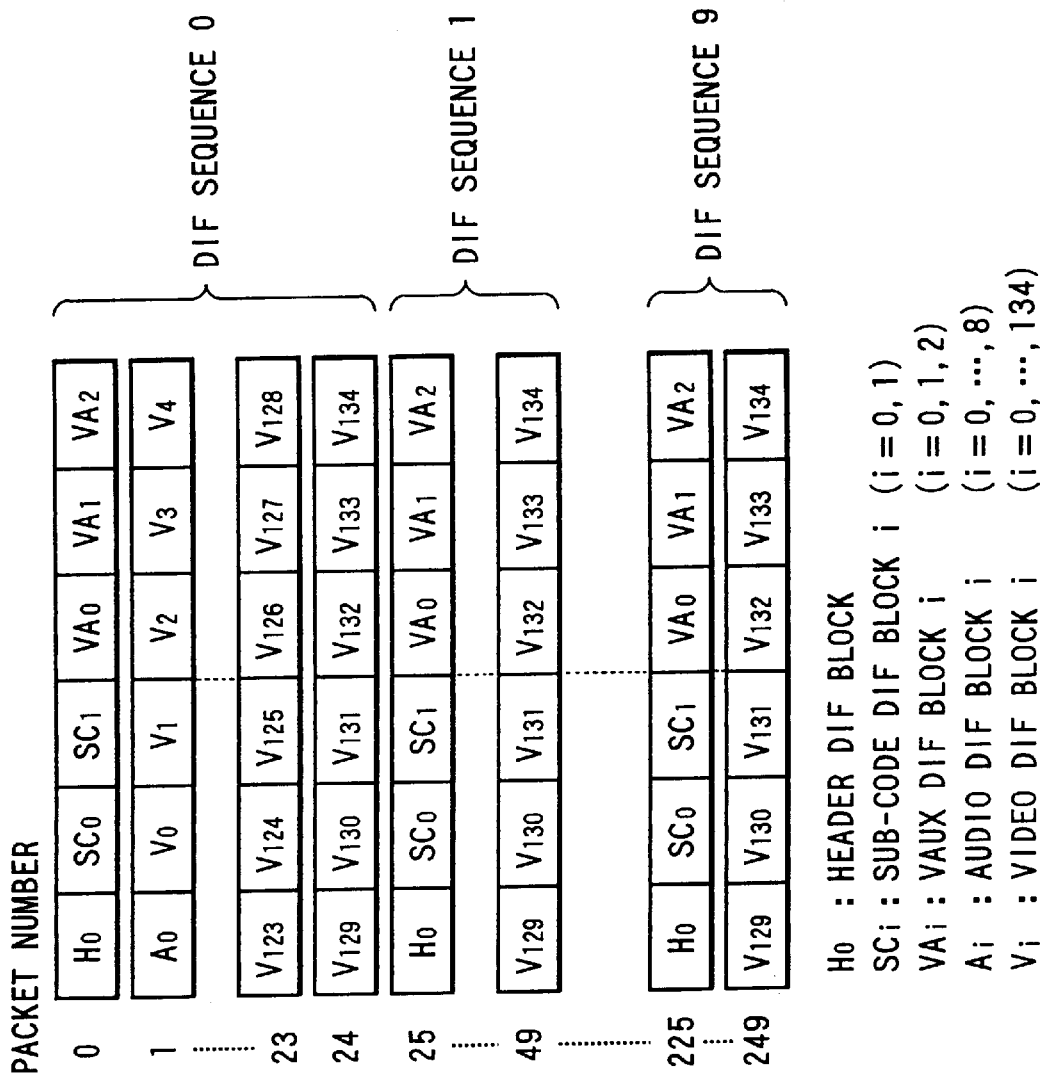
FIG. 6 shows a transfer procedure when image data of SD-VTR standard (525-60 system) is transferred by the isochronous communication.

Referring to FIG. 6, the transmission of the image data of the SD-VTR standard in the 1394 interface unit 119 is now explained.

The compressed image data of the SD-VTR standard reproduced from the magnetic tape 105 is corrected for error by the ECC 107 and directly inputted to the 1394 interface unit 119 through the switch 112. The 1394 interface unit 119 divides the image data into a plurality of data blocks by a predetermined procedure and packetizes it. FIG. 6 shows a transfer procedure when the image data of the SD-VTR standard (525-60 system) is transferred by the isochronous communication. In FIG. 6, the image signal and the voice signal have 80-byte block data called a DIF block as a basic unit, and 150 DIF blocks form one DIF sequence and 10 DIF sequences form one frame of image and voice data. When the 1394 interface unit 119 conducts the isochronous communication of one frame of image data of the SD-VTR standard, 6 DIF blocks form one isochronous packet data and 250 packet data are transmitted to complete the transmission of one frame of image data.

The 1394 interface unit 119 may packetize the digital image signal of the NTSC system and the digital/audio signal processed by the audio signal processing unit 113 to the isochronous packets, respectively to conduct the isochronous transfer.

As described above, digital data of a plurality of different formats are switched by the switch and inputted to the 1394 digital interface unit 119 in the time division fashion to packetize the digital data of the respective formats, and they are outputted from the physical layer of the 1394 interface unit 119 to the digital interface terminals 120 and 121. In transferring the data, it is to be understood that the protocol defined by the 1394 standard and the SD-VTR standard are followed.

Figure 8:
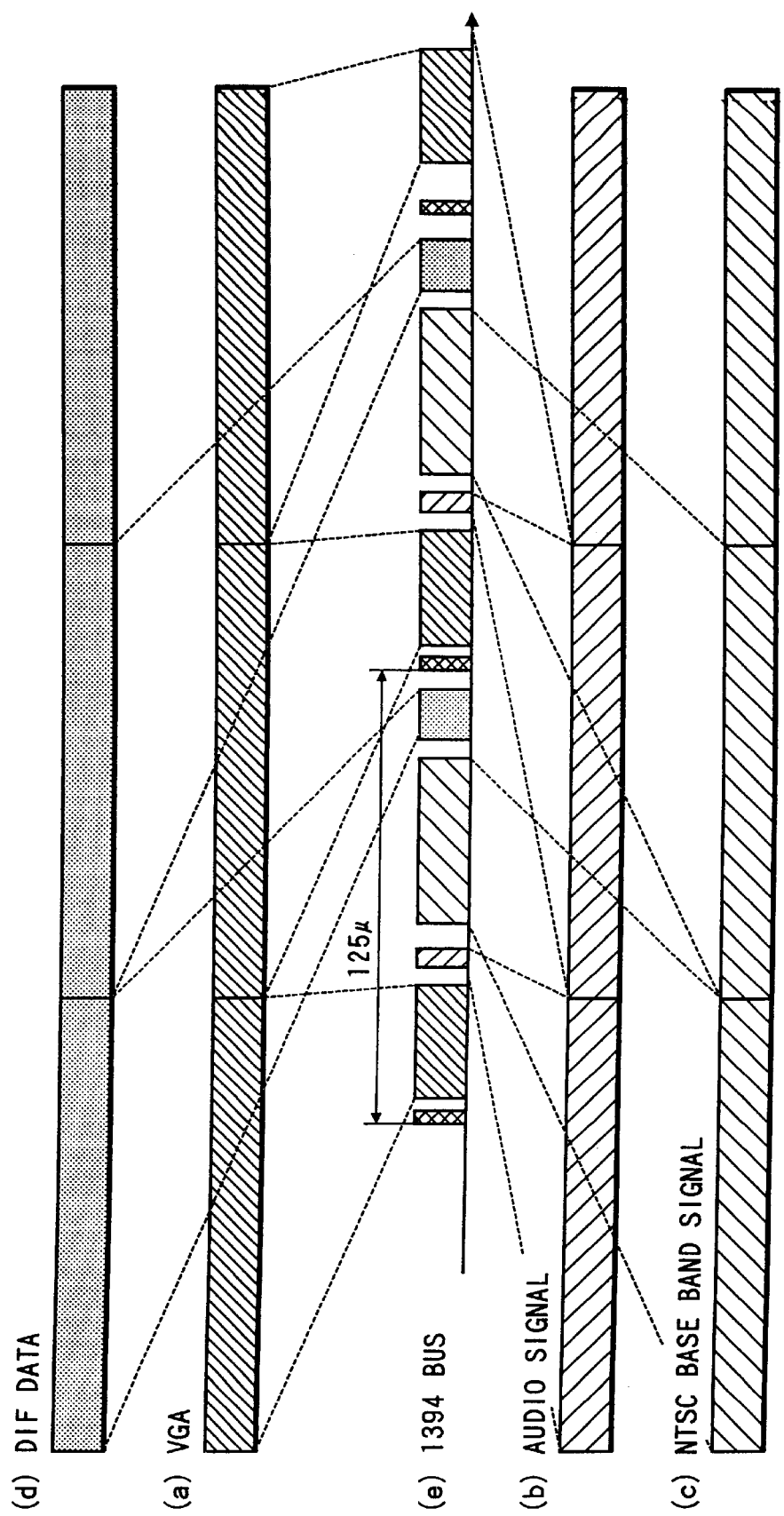
FIG. 8 illustrates the isochronous transfer of an image signals of different formats by a 1394 interface unit 119.

FIG. 8 shows a manner of the isochronous transfer when the digital data of different formats are packetized from the 1394 interface unit 119.

As described above, the 1394 interface unit 119 may packetize the digital image signals of a plurality of different formats to the isochronous packets and transfer them in each of the predetermined communication cycles. By securing a transfer band necessary when the image signals of the respective formats are communicated in the predetermined communication cycle, the isochronous communication of the image signals of a plurality of formats may be conducted in the predetermined communication cycle.

Second Embodiment

Figure 9:
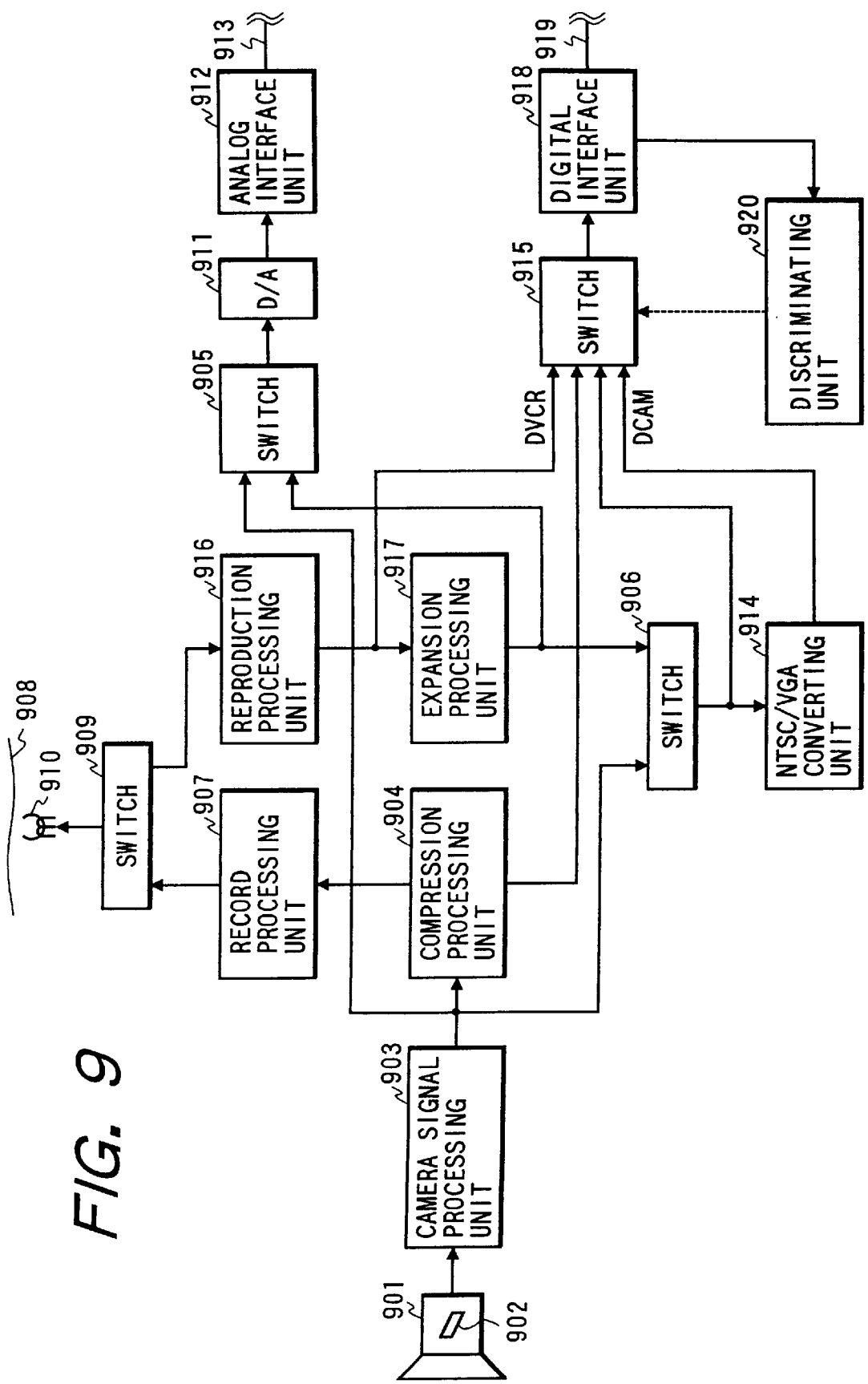
FIG. 9 shows a block diagram of a configuration of a camera-in-VTR in accordance with a second embodiment of the present invention.

FIG. 9 shows a camera-in-VTR in accordance with a second embodiment of the present invention. The camera-in-VTR has both an analog interface and a digital interface to communicate with an external equipment. The camera-in-VTR of the present embodiment may transmit a standard television signal such as the NTSC system or the PAL system to the external equipment through the analog interface. The camera-in-VTR of the present embodiment may also transfer a digital image signal such as the VGA format to the external equipment through the digital interface (for example, a digital interface conformable to the IEEE P1394 serial bus).

In FIG. 9, numeral 901 denotes a lens for focusing an optical image of an object and forming an image on a succeeding stage image pick-up element 902. The image pick-up element 902 comprises a CCD image sensor and converts the optical image from the lens 901 to an electrical signal and supplies it to a camera signal processing unit 903. The camera signal processing unit 903 processes the signal from the image pick-up element 902 into a predetermined signal form. An output from the camera signal processing unit 903 is supplied to succeeding stage processing units (a compression processing unit 904 and switches 905 and 906). The camera signal processing unit 903 of the present embodiment processes the image pick-up signal inputted from the image pick-up element 902 into a digital image signal of the NTSC system (525-60 system). Namely, in the camera signal processing unit 903 of the present embodiment, when an intensity signal Y and color difference signals U and V of the input signal from the image pick-up element 902 are generated, they are sampled such that a ratio of the sampling frequencies of the respective component signals (Y:U:V) is 4:2:2.

In a compression processing unit 904, predetermined data compression (for example, compression in SD format) is conducted. The compressed image signal is modulated in a record processing unit 907 and recorded on a magnetic tape 908 by a head through a switch 909. The compressed image signal is also inputted to a switch 915.

On the other hand, the digital NTSC signal inputted to the switch 905 is converted to an analog signal by a D/A converter 911 and it is outputted to a cable 913 connected to an external equipment through the analog interface 912.

The NTSC signal inputted to the switch 906 is directly inputted to the switch 115 and converted to a digital VGA signal by an NTSC/VGA conversion unit 914 and it is outputted to the switch 915.

The signal reproduced from the magnetic tape 908 by the head 910 is inputted to a reproduction processing unit 916 through the switch 909. The compressed image signal demodulated by the reproduction processing unit 916 is reconverted to a digital NTSC signal by a decompression processing unit 917 and it is inputted to the switch 905 and the switch 906.

The reproduced digital NTSC signal inputted to the switch 905 is converted to an analog signal by a D/A converter 911 and it is outputted to a cable 913 connected to the external equipment through the analog interface 912.

The reproduced digital NTSC signal inputted to the switch 906 is directly inputted to the switch 415 and converted to a digital signal by the NTSC/VGA conversion unit 914 and it is inputted to the switch 915.

The compressed image signal, the digital NTSC signal and the digital VGA signal inputted to the switch 915 are outputted to the 1394 serial bus through the cable 919 as the packets of the IEEE P1394 serial bus standard through the digital interface 918. On the other hand, the packet of the control information inputted from the cable connected to the external equipment 919 to the digital interface 918 is sent to a discrimination unit 920. The discrimination unit 920 switches the switch 915 in accordance with the content of the input control information.

The NTSC/VGA conversion unit 914 may conduct the same process as that of the format conversion unit 113 of the first embodiment. Namely, the image size of the image signal of the VGA format and the ratio of the sampling frequencies of YUV may be changed in accordance with the conformable transfer rate of the digital interface unit 918 or the control signal from the external equipment.

Figure 10:
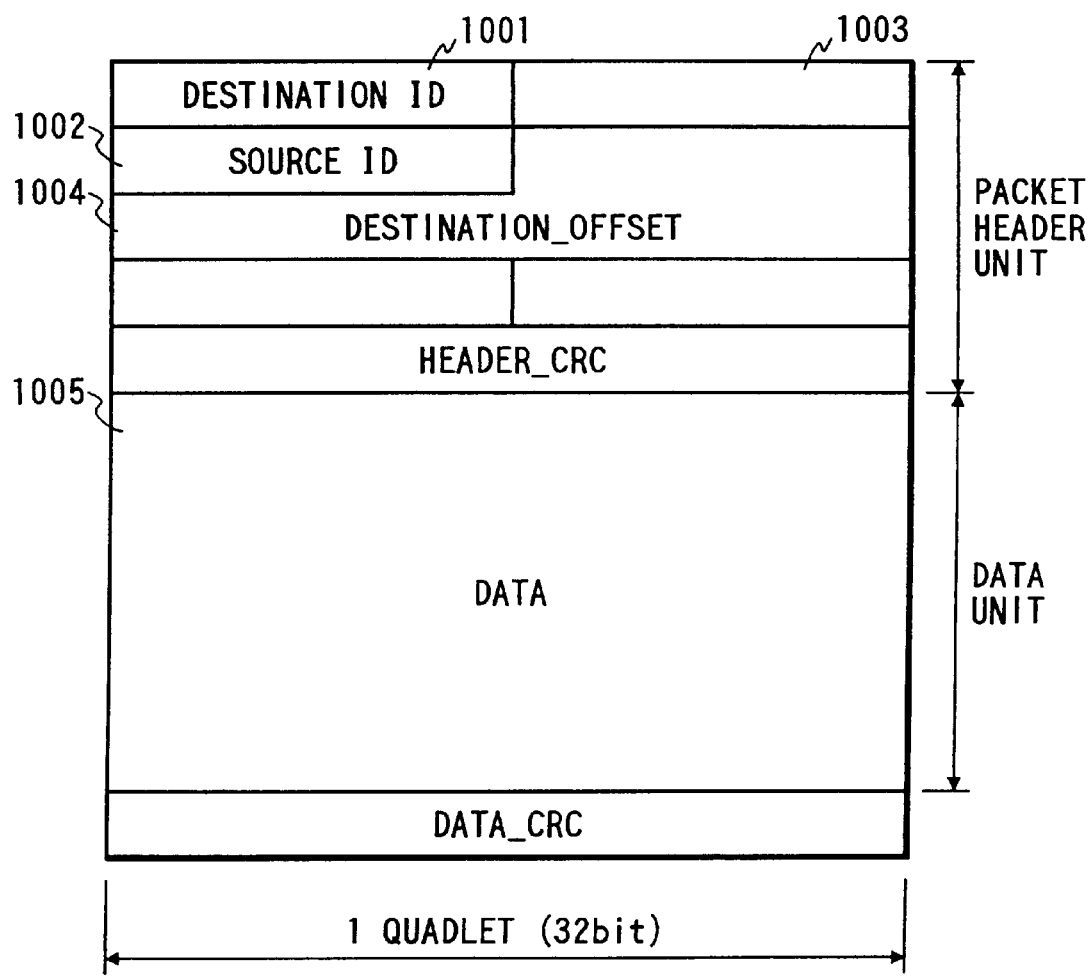
FIG. 10 shows a format of a packet of an asynchronous transfer mode complied to the IEEE P1394.

FIG. 10 shows an example of a packet of the control information received through the digital interface unit 918. In the present embodiment, the digital interface unit 918 may conduct the communication with the external equipment which conforms to the IEEE P1394. Accordingly, the external equipment transmits the control signal by the asynchronous transfer mode and the digital interface unit 918 receives the asynchronous packet of the structure shown in FIG. 10.

In FIG. 10, a field 1001 indicates an address ID and it indicates a physical address assigned to an equipment of a transmission destination (that is, a node ID assigned to each equipment on the P1394 serial bus). The physical address assigned to each node is assigned in a procedure which is conformable to the IEEE P1394 serial bus standard. A field 1002 indicates a node ID of a source node which sends a packet and a field 1003 indicates a label and a code of transaction between sending node and a receiving node.

A field 1004 indicates a 48-bit destination offset address to a destination node ID. The destination ID and the destination offset address form a 64-bit address to address a specific register or ROM in a specific node on the bus. Detail of the register standard on the bus is disclosed in the IEEE 1212 Standard. A field 1005 indicates a data field of control information and status information directed to the 64-bit address.

Figure 11:
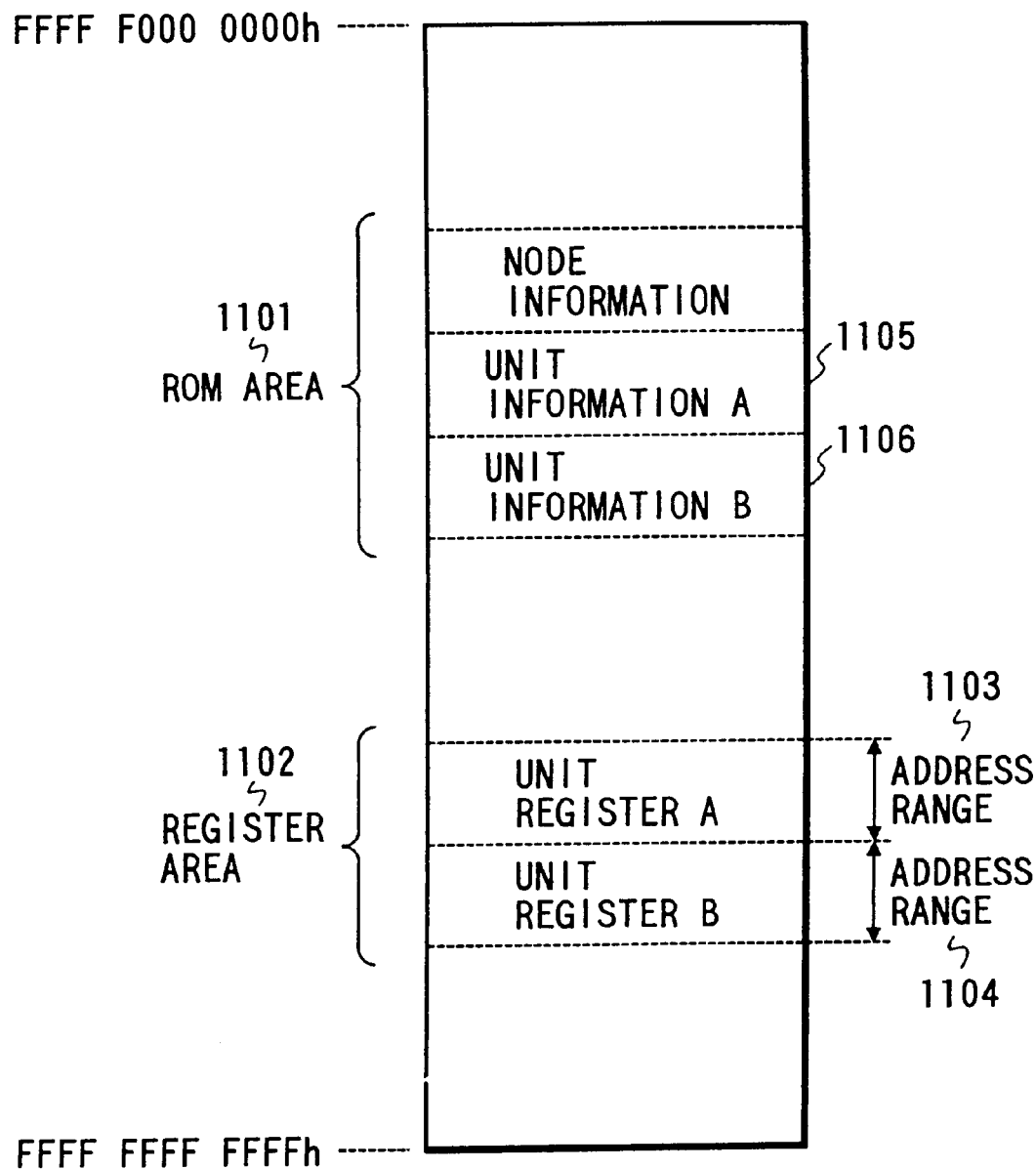
FIG. 11 shows an address space of a digital interface unit 918.

FIG. 11 shows a configuration of a register space of the camera-in-VTR of the second embodiment. FIG. 11 shows areas of FFFFF0000000 to FFFFFFFFFFFF in the register space represented by the 48-bit offset address. An ROM area 1101 contains a protocol of a bus on which the equipment (node) is mounted, a manufacturer's ID and information on units mounted on the equipment (node). The units indicate the functions provided in the node and the camera-in-VTR of the present embodiment has two units having different control protocols loaded therein. One function is a function of the digital VTR which copies the image data compressed in the SD-VTR system to a stationary digital VTR and outputs an analog NTSC signal to allow the watching of the image by a TV. The other function is a function as a digital camera which outputs a digital VGA camera to allow the watching of the image by a monitor of a computer.

A register area 1102 indicates a register for exchanging control information, status and data of the respective units. The register area 1102 is divided into a unit register A 1103 used by the unit of the digital VTR function and a unit register B 1104 used by the unit of the digital camera function. By reading the content of the ROM area, the other equipment connected to the present apparatus through the cable 919 can identify the address of the register to be used for the exchange of the control information by the respective units.

Figure 12:
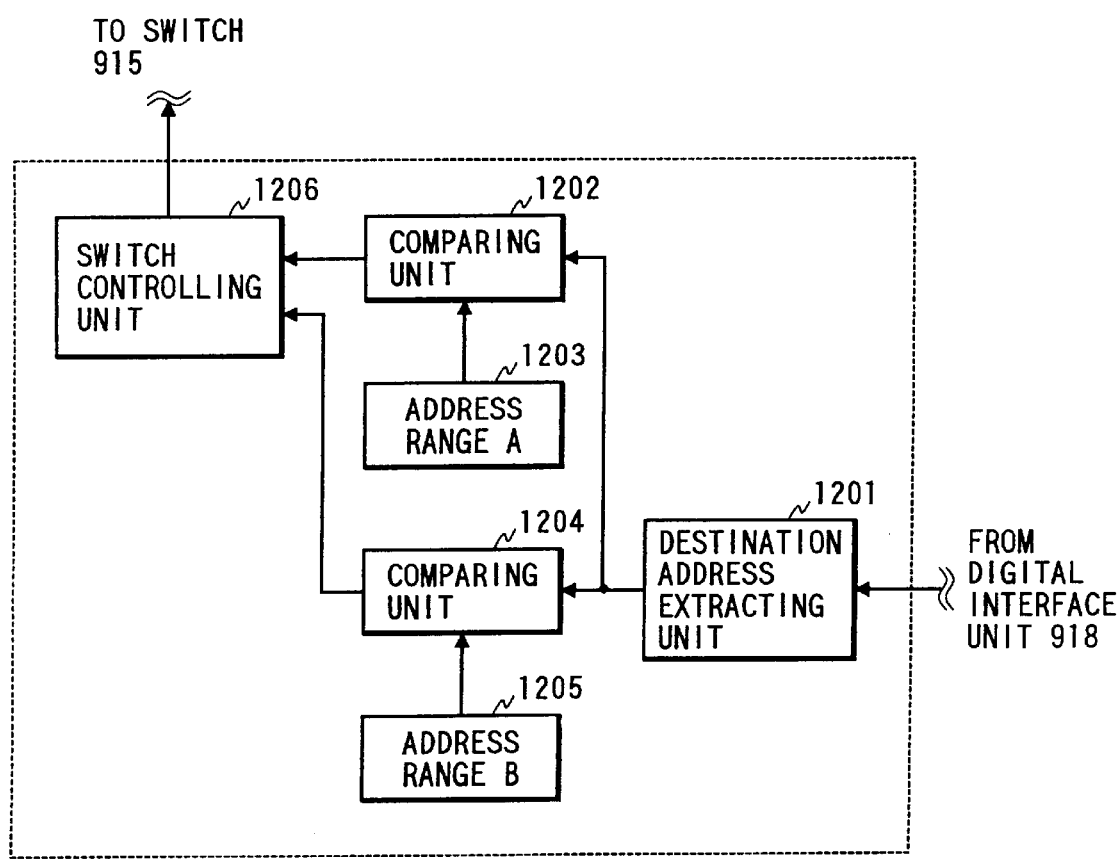
FIG. 12 shows a block diagram of a detailed configuration of a discrimination unit 920.

The discrimination unit 920 is now explained. FIG. 12 shows a configuration of the discrimination unit 920. In FIG. 12, the destination offset address of the control information packet sent from the digital interface 918 is extracted by a destination address extraction unit 1201.

The address extracted by the destination address extraction unit 1201 is inputted to an address comparison unit 1202 and compared with an address range A (1203). It is also inputted to a comparison unit 1204 and compared with an address range B (1205). The address range A (1203) indicates the address range 1103 of the register area 1102 shown in FIG. 11 and the address range B (1205) indicates the address range 1104 of the register area 1102 shown in FIG. 11. In accordance with the two comparison results, a switch control unit 1206 switches the switch 915 shown in FIG. 9. Specifically, when the address extracted by the destination address extraction unit 1201 is included in the address range A (1203), it is determined as the packet transmitted to the unit of the digital VTR and the operation of the processing unit relating to the digital VTR is controlled. Namely, the camera-in-VTR converts the image signal recorded on the magnetic tape 908 to image signals of a plurality of formats in the present embodiment, image signals of the SD-VTR standard, the NTSC system and the VGA format and supplies them to the digital interface unit 918 through the switch 915. The digital interface unit 918 may packetize at least one of the image signals of the SD-VTR standard, the NTSC system and the VGA format into the isochronous packet for transmission in accordance with the content of the control signal.

When the address extracted by the destination address extraction unit 1001 is included in the address range B (1005), it is determined as the packet transmitted to the unit of the digital camera and the operation of the processing unit relating to the digital camera is controlled. Namely, the image signal recorded in the camera signal processing unit 703 is converted to image signals of a plurality of formats (in the present embodiment, the image signals of the SD-VTR standard, the NTSC system and the VGA format) and they are supplied to the digital interface unit 918 through the switch 915. The digital interface unit 915 packetizes at least one of the image signals of the SD-VTR standard, the NTSC system and the VGA format to isochronous packets for communication in accordance with the content of the received control signal.

In the second embodiment, the image signals of a plurality of formats may be transmitted from the image pick-up device such as the camera-in-VTR through the digital interface. Accordingly, by converting the image signal of the NTSC system to the image signal of the VGA format for transmission, it may be transmitted to a personal computer in a very inexpensive way without requiring an additional digital camera dedicated to the personal computer.

In the second embodiment, by using the digital interface which is capable of communication conformable to the IEEE P1394 as the digital interface, the transmission may be attained while maintaining the time concurrence of the image signals of the different formats. Namely, by conducting the isochronous communication of the image signals of the plurality of formats in a predetermined communication cycle in the time division fashion, the identical image signal may be transmitted to the respective equipments on the 1394 communication system as the image signals of the plurality of formats.

Further, one equipment (node) may conform to both the digital VTR function and the digital camera function, and the unit of the function to which the packet is transmitted is determined to switch the data format to be outputted to the external equipment without requiring the user to switch the function.

The present invention may be embodied in other specific forms without departing from the spirit or essential features thereof.

For example, in the present embodiment, the image signal is converted to the formats of the NTSC, the VGA and the SD-VTR standard but the present invention is not limited thereto and the transmission of the image data of the MPEG2 or ATV format may be attained by providing a conversion processing unit which is conformable to those formats.

Therefore, the above-mentioned embodiments are mere examples in all respects and must not be construed to limit the present invention.

The scope of the present invention is defined solely by the scope of the appended claims and is not limited at all by the specific description of the specification. Furthermore, all the modifications and changes belonging to equivalents of the claims are considered to fall within the scope of the present invention.

What is claimed is:

1. An image pick-up apparatus comprising:
    (a) an image pick-up unit which generates a first digital image of a first format;
    (b) a decompressor which decompresses a compressed digital image reproduced from a recording medium, and generates a second digital image of the first format;
    (c) a converter which converts one of the first and second digital images of the first format to a digital image of a second format;

(d) a digital interface which outputs the digital image of the second format from the image pick-up apparatus; and (e) an analog interface which converts one of the first and second digital images of the first format to an analog image signal, and outputs the analog image signal from the image pick-up apparatus.

2. An apparatus according to claim 1, wherein said digital interface also outputs the compressed digital image reproduced from the recording medium.

3. An apparatus according to claim 1, wherein the first format is a format suited for a television monitor and the second format is a format suited for a computer monitor.

4. An apparatus according to claim 3, wherein the first format is NTSC format, and the second format is VGA format.

5. An apparatus according to claim 1, wherein the compressed digital image is compressed by an SD format.

6. An apparatus according to claim 1, wherein said digital interface has an isochronous transfer mode which is capable of transferring predetermined amount of data in every predetermined cycle.

7. An apparatus according to claim 1, wherein said digital interface is in accordance with an IEEE 1394.

8. An apparatus according to claim 1, wherein said image pick-up apparatus is a digital video recorder with a camera.

9. An apparatus according to claim 1, further comprising:

a compressor which compresses the first digital image of the first format outputted from said image pick-up unit; and a recorder which records the first digital image compressed by said compressor on the recording medium.

10. An apparatus according to claim 1, wherein the second format is MPEG2 format.

* * * * *